(12) United States Patent
Sakuma et al.

(10) Patent No.: US 6,715,812 B2
(45) Date of Patent: Apr. 6, 2004

(54) METHOD OF MOUNTING ASSIST GRIP AND MOUNTING STRUCTURE THEREOF

(75) Inventors: Yoshiyuki Sakuma, Aichi-ken (JP); Takashi Hosokawa, Aichi-ken (JP); Chiharu Totani, Aichi-ken (JP); Hiroyuki Tajima, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/925,018

(22) Filed: Aug. 9, 2001

(65) Prior Publication Data
US 2002/0020250 A1 Feb. 21, 2002

(30) Foreign Application Priority Data
Aug. 9, 2000 (JP) ........................................ 2000-241602

(51) Int. Cl.[7] .................................................. B60N 3/12
(52) U.S. Cl. ........................ 296/1.02; 411/508; 411/45
(58) Field of Search .................. 16/444, 445; 411/508, 411/45; 29/525.01; 296/37.7

(56) References Cited

U.S. PATENT DOCUMENTS

| 4,981,322 A | | 1/1991 | Dowd et al. |
|---|---|---|---|
| 5,358,299 A | * | 10/1994 | Seto |
| 5,560,575 A | * | 10/1996 | Krysiak |
| 5,625,921 A | * | 5/1997 | Smith |
| 5,636,891 A | * | 6/1997 | Van Order et al. |
| 5,991,976 A | * | 11/1999 | Adams et al. |
| 6,003,928 A | | 12/1999 | Curtindale |
| 6,015,126 A | | 1/2000 | Murdock |
| 6,021,986 A | | 2/2000 | Murdock |
| 6,048,125 A | * | 4/2000 | Droche et al. |
| 6,076,233 A | * | 6/2000 | Sasaki et al. |
| 6,397,435 B1 | * | 6/2002 | Gosselet |

FOREIGN PATENT DOCUMENTS

| EP | 0967 136 A2 | 12/1999 |
|---|---|---|
| JP | 2540746 | 4/1997 |
| JP | 10-029453 | 2/1998 |

* cited by examiner

*Primary Examiner*—Douglas Olms
*Assistant Examiner*—Steve Blount
(74) *Attorney, Agent, or Firm*—Posz & Bethards, PLC

(57) ABSTRACT

The present invention provides an improved method of mounting an assist grip to a body panel and related mounting structure elements that provide a removable attachment between the assist grip and the body panel and that simplify the manufacture of the body panel as well as the assembly and disassembly of the assist grip to the body panel.

2 Claims, 7 Drawing Sheets

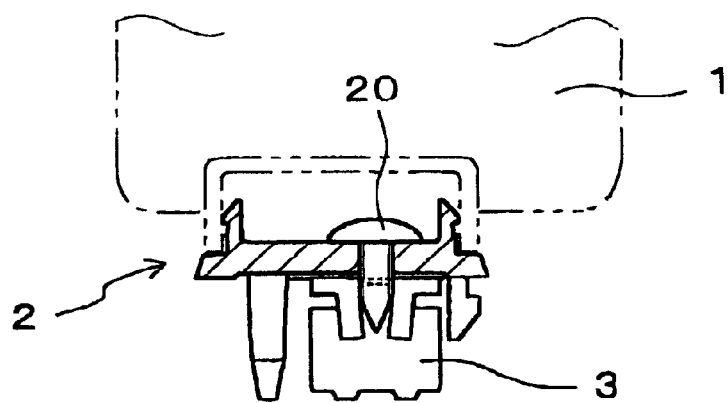
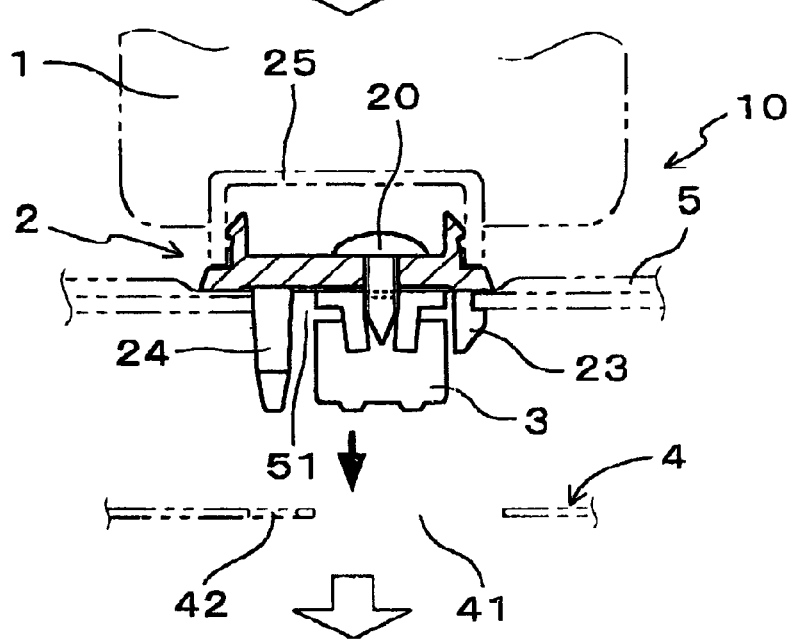
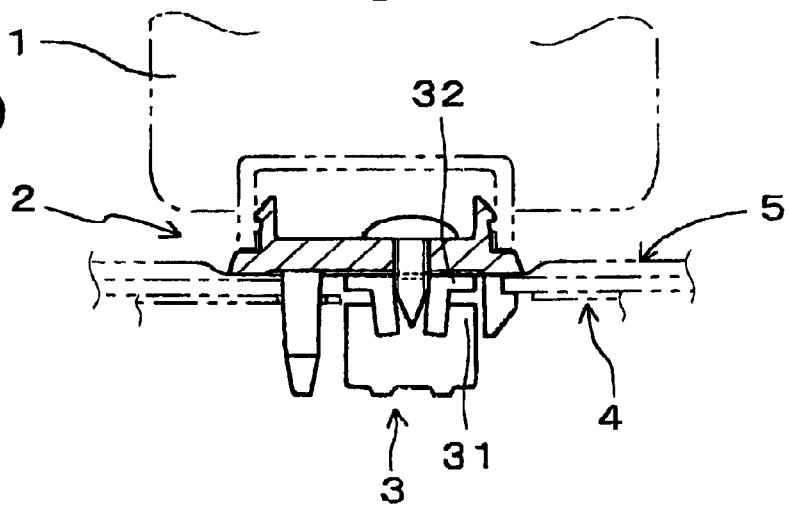

PRIOR ARTS

METHOD OF MOUNTING ASSIST GRIP AND MOUNTING STRUCTURE THEREOF

CROSS-REFERENCES TO RELATED APPLICATIONS

The present application claims priority under 35 U.S.C. §119 to Japanese Patent Application No. 2000-241602, filed on Aug. 9, 2000, entitled "METHOD OF MOUNTING ASSIST GRIP AND MOUNTING STRUCTURE THEREOF". The contents of this application are incorporated herein by reference in their entirety.

BACKGROUND OF THE INVENTION

1. Field of the Invention

The present invention relates to a method of mounting an assist grip or handle, which is mounted in the interior of an automobile and can support the posture of a person and a mounting structure thereof.

2. Discussion of the Background

Conventionally, an assist grip is mounted in the interior of an automobile or similar vehicle in order to support the posture of a person who is sitting on the seat adjacent the assist grip.

As shown in FIG. 7(a), an assist grip 91 having a grip section 911 where a person grips and engaging sections 912 provided on both ends of the assist grip 911. Then, an intermediate attachment member 92 is provided on the engaging section 912 for mounting the assist grip 91 on a body panel 4 of an automobile or the like.

As shown in FIG. 7(b) and FIG. 7(c), when the assist grip 91 is mounted on the body panel 4 of an automobile or the like, the intermediate attachment member 92 is fitted into the body panel 4 by screwing a screw 93 into a nut 94 attached, preferably by welding, on the body panel 4.

However, there are certain problems associated with this conventional method of mounting the assist grip 91.

In the conventional mounting method, the assist grip 91 is directly placed by means of the screw 93 on the body panel 4 placed on the main frame of an automobile. Therefore, the screw 93 has to be turned and mounted where the workspace is small, complicating the installation and compromising the workability thereof.

Moreover, it is required that the nut 94 has been previously attached on the body panel 4. Therefore, when the body panel 4 is manufactured, the step for attaching the nut 94 has to be carried out, thereby complicating the manufacture of the body panel 4.

SUMMARY OF THE INVENTION

An object of the present invention is to provide a method of mounting an assist grip and a mounting structure capable of being both attachable and detachable as well as being easily mounted and thereby simplifying the manufacturing steps of a body panel.

According to the first aspect of the invention, a method of mounting an assist grip on a body panel is provided comprising:

preparing a fitting and fixing clip which cannot be pulled out once it is inserted into an engaging hole provided on the body panel;

previously arranging an intermediate attachment member on both ends of the assist grip, wherein the fitting and fixing clip is fixed on the intermediate attachment member in an attachable and detachable manner; and mounting the assist grip on the body panel by inserting the fitting and fixing clip into the engaging hole of the body panel.

The noteworthy point of the present invention is that the assist grip is mounted on the body panel by inserting the fitting and fixing clip, which is, in turn, removably attached to the intermediate attachment member, into the engaging hole of the body panel.

In the present invention, a fitting and fixing clip is used for mounting the assist grip on the body panel. This fitting and fixing clip has previously been fixed to the intermediate attachment member in an attachable and detachable manner. Then, by inserting the fitting and fixing clip into an engaging hole of the body panel, the assist grip is mounted on the body panel. With this arrangement, the assist grip can be mounted on the body panel with single-step operation simply by inserting the fitting and fixing clips. Therefore, this means of mounting an assist grip on a body panel eliminates the need for work such as turning a screw in a confined or restricted space as required in the conventional mounting operation. The present invention thereby simplifies the mounting of an assist grip on a body panel.

Moreover, for example, when performing maintenance operations and so forth that require that the assist grip be removed, the assist grip can be easily removed by disengaging the fitting and fixing clip from the intermediate attachment member while retaining the fitting and fixing clip on the body panel. Therefore, the removal and reattachment of the assist grip can be easily repeated by disengaging and then re-engaging the fitting and fixing clip and the intermediate attachment member.

Moreover, in the present invention, the steps such as positioning and welding or otherwise attaching a nut on the body panel as is necessary in conventional mounting operations need not to be carried out. Therefore, a simplification of the manufacturing steps necessary to produce the body panel can be realized.

According to the second aspect of the invention, there is provided a mounting structure of an assist grip on a body panel, wherein intermediate attachment members are arranged on both ends of the assist grip, a fitting and fixing clip (which cannot easily be removed once it has been inserted into an engaging hole provided on the body panel) is fixed on the intermediate attachment member in an attachable and detachable manner, and the assist grip is mounted on the body panel by engaging the fitting and fixing clip with the engaging hole provided on the body panel.

In the present invention, the assist grip is mounted on the body panel in a single-step operation by engaging the fitting and fixing clip with the engaging hole provided on the body panel. Hence, the mounting structure of the assist grip is simplified.

Moreover, in a fashion similar to that described above, the attachment and detachment of an assist grip can be easily repeated by attaching and detaching the fitting and fixing clip and the intermediate attachment member after the mounting has been carried out. Moreover, the steps such as positioning and welding or otherwise attaching the nut on the body panel and so forth as required in a conventional assembly process are no longer necessary, therefore, the process of manufacturing the body panel can be simplified.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 4(a) is an illustration showing a state where a fitting and fixing clip is fixed on an intermediate attachment member by means of a screw in a method of mounting an assist grip according to an embodiment of the invention;

FIG. 4(b) is an illustration showing a state where an assist grip on which an intermediate attachment member and a fitting and fixing clip are mounted the interior panel and a temporary assembly body is made in a method of mounting an assist grip according to an embodiment of the invention;

FIG. 4(c) is an illustration showing a state where a temporary assembly body was mounted on a body panel in a method of mounting an assist grip according to an embodiment of the invention;

DESCRIPTION OF THE PREFERRED EMBODIMENTS

In the above-described first aspect of the present invention, it is preferable that an interior panel is arranged on the surface of the interior side of the body panel, the assist grip is mounted on the body panel by inserting the fitting and fixing clip through a penetrating hole provided on the interior panel and into the engaging hole provided on the body panel.

With this arrangement, even in the case where an interior panel is mounted on the interior side of the body panel, the assist grip can be easily mounted.

Next, it is preferable that the intermediate attachment members have an engaging claw capable of engaging with the peripheral section of a penetrating hole in the interior panel on a face opposed to the body panel. With such an arrangement, a temporary assembly body may be formed by integrating the assist grip and the interior panel by engaging the engaging claw with the penetrating hole. This temporary assembly body is, in turn, mounted on the body panel with the fitting and fixing clip being inserted into an engaging hole of the body panel.

With this arrangement, an assist grip is mounted on a body panel, and at the same time, an interior panel can be mounted on the body panel. Therefore, the mounting of the assist grip on the body panel becomes still easier.

Next, in the second aspect of the present invention, it is preferable that an interior panel is arranged on the surface of the interior side of the body panel, and the assist grip is mounted on the body panel by engaging the fitting and fixing clip with an engaging hole of the body panel through a penetrating hole provided on the interior panel.

With this arrangement, even in the case where an interior panel exists on the interior side of the body panel, the mounting structure of the assist grip can be simplified.

Next, it is preferable that the intermediate attachment member have an engaging claw capable of engaging with the peripheral section of a penetrating hole in the interior panel on a face opposed to the body panel, the assist grip and the interior panel are integrated by engaging the engaging claw with penetrating hole.

With this arrangement, the assist grip is mounted on the interior panel as well as it is mounted on the body panel. Therefore, the mounting structure of the assist grip is still stronger.

A method of mounting an assist grip and mounting structure thereof of an example of the embodiment of the present invention will be described below with reference to FIG. 1 through FIG. 6.

Figure 1:
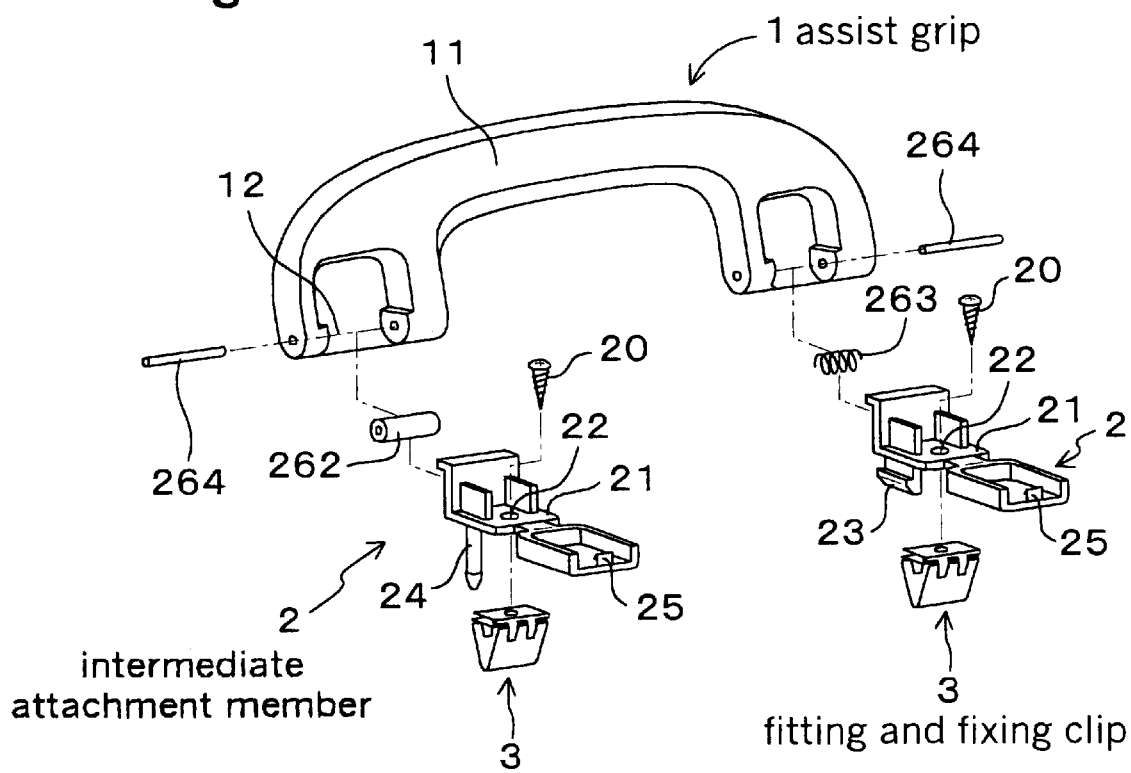
FIG. 1 is an illustration showing an arrangement of an intermediate attachment member and a fitting and fixing clip on an assist grip according to an embodiment of the invention.
Figure 2:
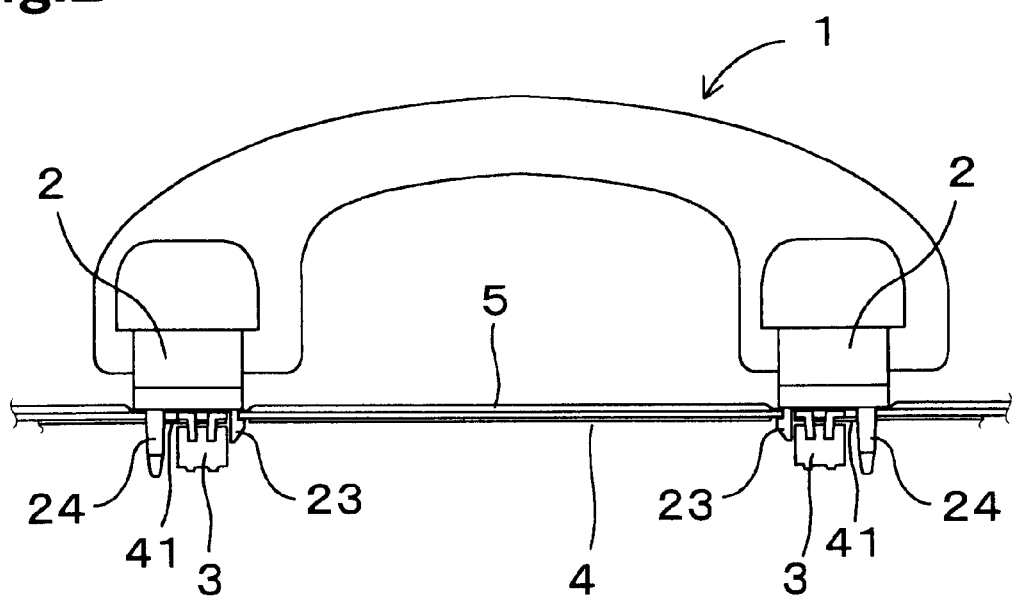
FIG. 2 is an illustration showing a state where an assist grip is mounted on a body panel according to an embodiment of the invention.

In a preferred embodiment, as shown in FIGS. 1 and 2, when an assist grip 1 is mounted on a body panel 4, first, a fitting and fixing clip 3 which cannot be pulled out once it is inserted into an engaging hole 41 provided on the body panel 4 is prepared. Moreover, an intermediate attachment member 2 has been previously arranged on both ends of the assist grip 1 with a pair of fitting and fixing clips 3 also being fixed to the pair of intermediate attachment members 2 in an attachable and detachable manner.

Then, as shown in FIG. 2, the assist grip 1 is mounted on the body panel 4 by inserting the fitting and fixing clip 3 into the engaging hole 41 of the body panel 4.

A basic mounting procedure will be mounted below.

As shown in FIG. 1, the assist grip 1 includes intermediate attachment members 2 arranged on both ends thereof. The assist grip 1 has a grip section 11 where a person grips and engaging sections 12 provided on both ends thereof. On these engaging sections 12, the intermediate attachment members 2 for mounting the assist grip 1 on the body panel 4 are arranged.

Figure 3A:
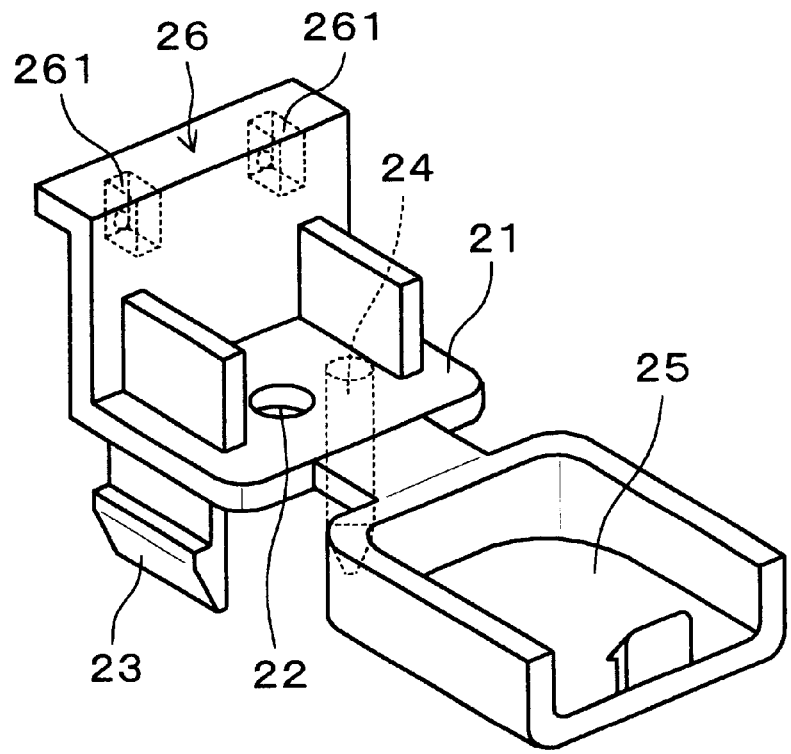
FIG. 3(a) is a perspective view showing an intermediate attachment member element according to an embodiment of the invention.
Figure 5A:
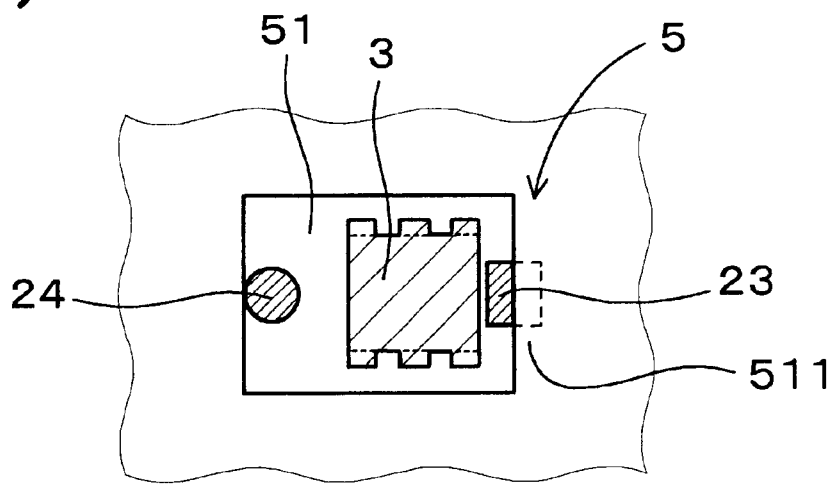
FIG. 5(a) is a plan view showing a state where an engaging claw of an intermediate attachment member is engaged with a penetrating hole of interior panel according to an embodiment of the invention.

As shown in FIG. 3(a), 4(a) and 5(a), the intermediate attachment members 2 each have a hole 22 at the center of the substrate section 21, through which a fastener 20, such as a screw, penetrates the fitting and fixing clip 3 (see also FIG. 5(a)) for engaging with the peripheral section 511 of a penetrating hole 51 in an interior panel 5 on backside thereof and an inserting guide 24 to be inserted into a drill hole 42 in the body panel. Moreover, the intermediate attachment member 2 has a cover section 25 coupled to an end section of the substrate section 21 in a flexible manner, and after the fitting and fixing clip 3 is mounted on the intermediate attachment member 2, this cover section 25 may be closed to improve the appearance of the mount.

Moreover, on the backside of the intermediate attachment member 2, a support section 26 for engaging section 12 of the assist grip 1 is formed. Since the assist grip 1 in the present embodiment is rotatable, the support section 26 is preferably formed a pair of bearings 261, and when it is engaged with the assist grip 1, it is engaged with a pivot rod 264 via a damper 262 and/or a spring 263 (see FIG. 1).

Figure 3B:
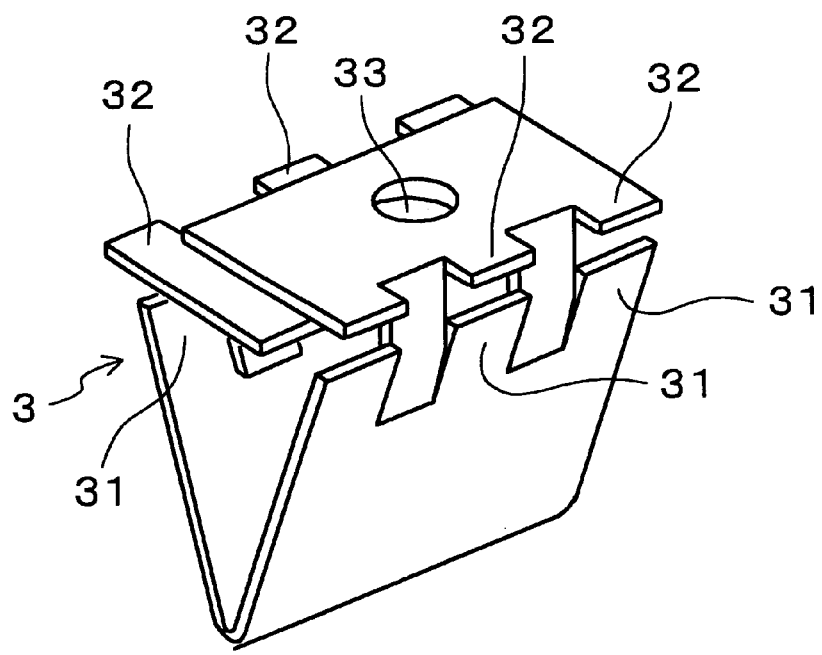
FIG. 3(b) is a perspective view showing a fitting and fixing clip according to an embodiment of the invention.

As shown in FIG. 3(b), the fitting and fixing clip 3 has a stopping claw 31 to be inserted into the engaging hole 41 provided on the body panel 4, and a stopping flange 32 to be engaged with the periphery of the engaging hole 41. Then, as to the fitting and fixing clip 3 is inserted into the engaging hole 41, the stopping claw 31 deflects to pass through engaging hole 41. As stopping claw 31 passes through engaging hole 41, it returns to its original undeflected position allowing it to engage the body panel at the periphery of the engaging hole. The stopping flange 32 is configured and arranged to arrest the movement of the fitting and fixing clip 3 in the insertion direction. Once fully inserted, the stopping claw 31 and the stopping flange 32 act in concert to prevent further insertion or removal of the fitting or fixing clip 3.

The fitting and fixing clip 3 is a product, which is preferably formed from one sheet of plate that is cut and integrally processed. The fitting and fixing clip 3 is fixed to the intermediate attachment member 2 by inserting fastener 20, such as a screw, through hole 22 and into a corresponding hole 33 provided on the fitting and fixing clip 3.

Next, a method of mounting the assist grip 1 on the body panel 4 will be described below.

First, as shown in FIG. 4(a), the fitting and fixing clip 3 is fixed on the intermediate attachment member 2 by means of the fastener 20 and the cover section 25 of the intermediate attachment member 2 is closed. At this moment, the intermediate attachment member 2 is engaged with the assist grip 1 by the engaging section 12 of the assist grip 1 by means of the pivot rod 264 and the support section 26 of the intermediate attachment member 2.

Next, as shown in FIG. 4(b), the assist grip 1 to which the intermediate attachment member 2 and the fitting and fixing clip 3 are attached is mounted on the interior panel 5 so that the engaging claw 23 of the intermediate attachment member 2 engages the periphery of the penetrating hole 51 of the interior panel 5 (see FIG. 5(a)), to form a temporary assembly body 10.

Figure 5B:
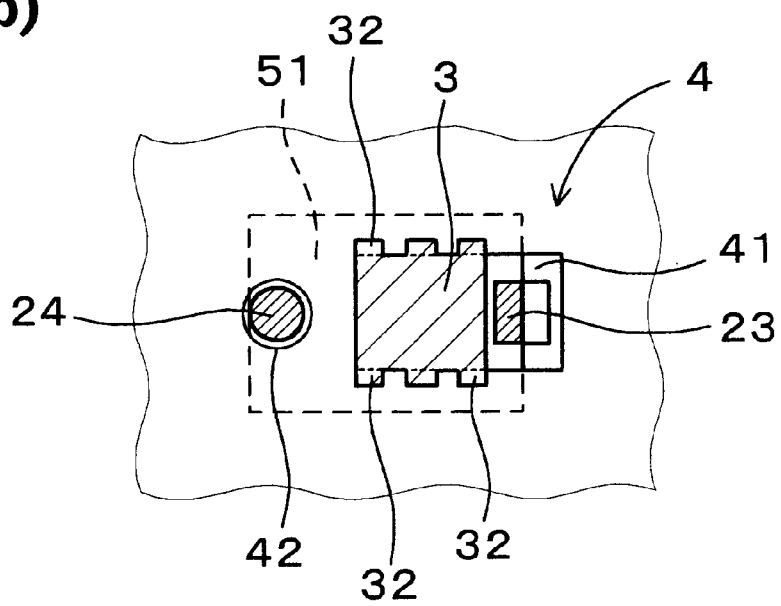
FIG. 5(b) is a plan view showing a state where a fitting and fixing clip was engaged and stopped in an engaging hole of a body panel according to an embodiment of the invention.

Then, as shown in FIG. 4(c), the temporary assembly body 10 is, in turn, mounted on the body panel 4 with single-step operation by inserting the fitting and fixing clip 3 into the engaging hole 41 of the body panel 4 (see FIG. 5(b)). At this moment, the stopping claw 31 of the fitting and fixing clip 3 and the stopping flange 32 engage the periphery of the engaging hole 41. Moreover, at this moment, the inserting guide 24 of the intermediate attachment member 2 is inserted into the inserting hole 42, as shown in FIG. 4(b), is provided on the body panel 4, whereby the assist grip 1 is mounted at the precise intended position on the body panel 4.

Now, a method of removing the assist grip 1 when carrying out maintenance will be described below.

Figure 6:
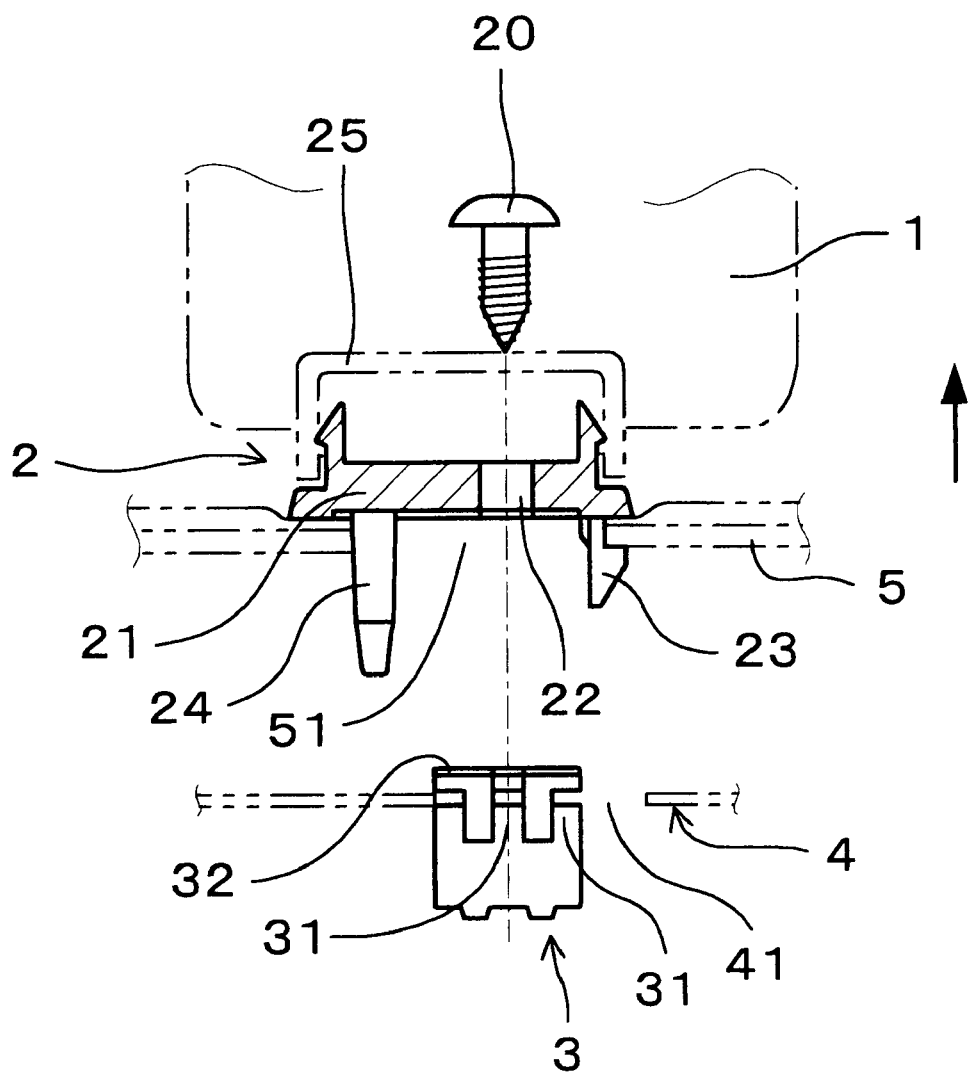
FIG. 6 is an illustration showing a state where an interior panel on which an intermediate attachment member and an assist grip are mounted was removed from a body panel according to an embodiment of the invention.
Figure 7A:
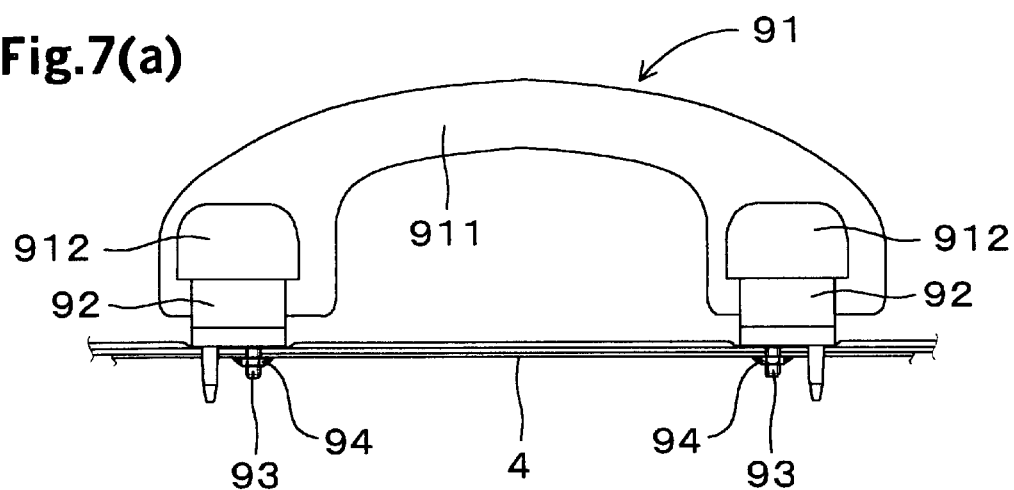
FIG. 7(a) is an illustration showing a state where an assist grip is mounted on a body panel in a conventional example.
Figure 7B:
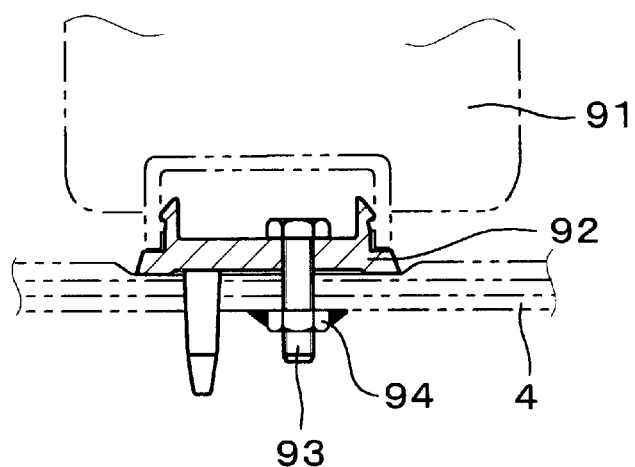
FIG. 7(b) is a partially enlarged illustration showing a state where an assist grip is mounted on a body panel by means of a screw and a weld nut in a conventional example.
Figure 7C:
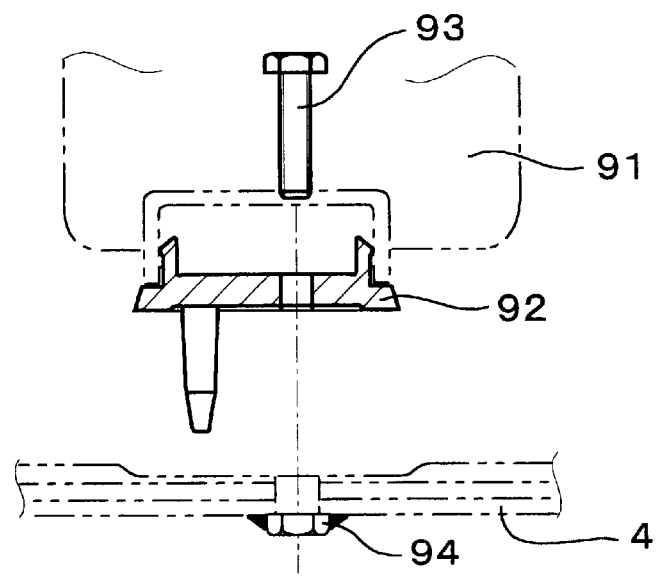
FIG. 7(c) is a partially enlarged illustration showing a state where a screw is disengaged and an assist grip was removed from a body panel in a conventional example.

As shown in FIG. 6, the cover section 25 of the intermediate attachment member 2 is opened and the fastener 20 is removed, allowing the interior panel 5, the intermediate attachment member 2 and the assist grip 1 to be as a unit. The fitting and fixing clip 3, however, remains on the body panel 4 as it is. Thus, the assist grip 1 can be mounted and removed freely over and over again after the initial mounting is carried out.

Next, a mounting structure of the assist grip 1 on the body panel 4 will be described below.

As shown in FIG. 2, an intermediate attachment member 2 is arranged at either end of the assist grip 1; on each of the intermediate attachment members 2, is, in turn, removably attached to a fitting and fixing clip 3; the fitting and fixing clip 3 is fixed in an engaging hole 41 provided on the body panel 4.

Moreover, an interior panel 5 may be arranged on the surface of the interior of the body panel 4, with the fitting and fixing clip 3 being engaged with the engaging hole 41 of the body panel 4 through a penetrating hole 51 provided on the interior panel 5. With this arrangement, the assist grip 1 is integrated with the body panel 4 and the interior panel 5.

Next, the effect of an action of the present example will be described below.

In the present example, when the assist grip 1 is mounted on the body panel 4, the fitting and fixing clip 3 is used. This fitting and fixing clip 3 has been previously fixed on the intermediate attachment member 2 in an attachable and detachable manner. Then, the fitting and fixing clip 3 is mounted on the body panel 4 by inserting the fitting and fixing clip 3 into the engaging hole 41 of the body panel 4.

At this moment, the assist grip 1 can be mounted on the body panel 4 with single-step operation by inserting the fitting and fixing clip 3 into the engaging holes 41. Therefore, the mounting of the assist grip 1 on the body panel 4 is extremely easy.

Moreover, for example, when maintenance or other operations in which it is necessary to remove the assist grip 1, the assist grip 1 can be easily removed while the fitting and fixing clip 3 remains on the body panel 4 as it is by disengaging the attachment between the fitting and fixing clip 3 and the intermediate attachment member 2.

Therefore, the assist grip 1 can be easily attached and detached repeatedly by attaching and detaching the fitting and fixing clip 3 from the intermediate attachment member 2 after the initial mounting has been completed.

Moreover, on the body panel 4, it may be enough to provide only the engaging hole 41 with in which the fitting and fixing clip 3 is engaged, and it may be not required to provide an altered mounting section such as a nut or the like as in conventional methods. Therefore, the manufacturing steps of the body panel 4 can be simplified.

The temporary assembly body 10, in which the assist grip 1 on which the intermediate attachment member 2 and the fitting and fixing clip 3 are mounted has been joined to an interior panel 5, is mounted on the body panel 4 with single-step operation. Therefore, the assist grip 1 can be mounted on the body panel 4, and at the same time, the interior panel 5 is mounted on the body panel 4. Therefore, the mounting of the assist grip 1 on the body panel 4 is easier still.

Obviously, numerous modifications and variations of the present invention are possible in light of the above teachings. It is therefore to be understood that, within the scope of the appended claims, the invention may be practiced otherwise than as specifically described here.

What is claimed is:

1. An assembly for removably mounting a fixture including an assist grip and an interior panel to a body panel comprising:

an intermediate attachment member being configured for attachment of the fixture adjacent a first face of the intermediate attachment member;

a clip being removably fastened to a second face of the intermediate attachment member, the clip comprising both a resilient locking member and a stopping member, the locking member configured for insertion into a hole in the body panel and the stopping member being configured to prevent entry into the hole, wherein the resilient locking member is compressed during at least a final portion of its insertion into the hole and expands after being inserted completely through the hole to engage a back portion of the body panel adjacent the hole to thereby prevent the clip from being withdrawn from the hole, wherein the stopping member contacts the front portion of the body panel adjacent the hole and thereby prevents the clip from being inserted further into the hole, the stopping member contacts the front portion of the body panel as the resilient locking member expands to contact the back portion of the body panel, thereby fixing the clip within the hole in the body panel, and the intermediate attachment member further includes an engaging claw capable of engaging a peripheral section of a penetrating hole of the interior panel on a face of the interior panel opposed to the body panel to integrate the assist grip and the interior panel into the fixture, the fixture being attachable to the body panel by the clip.

2. The assembly of claim 1, wherein the engaging claw is resilient, thereby enabling the engaging claw to be inserted through the penetrating hole of the interior panel and to subsequently engage the peripheral section of the penetrating hole of the interior panel on the face of the interior panel opposed to the body panel.

* * * * *